March 23, 1965    D. ARONSON ETAL    3,174,296
REFRIGERATION PURGE SYSTEM
Filed Feb. 14, 1964
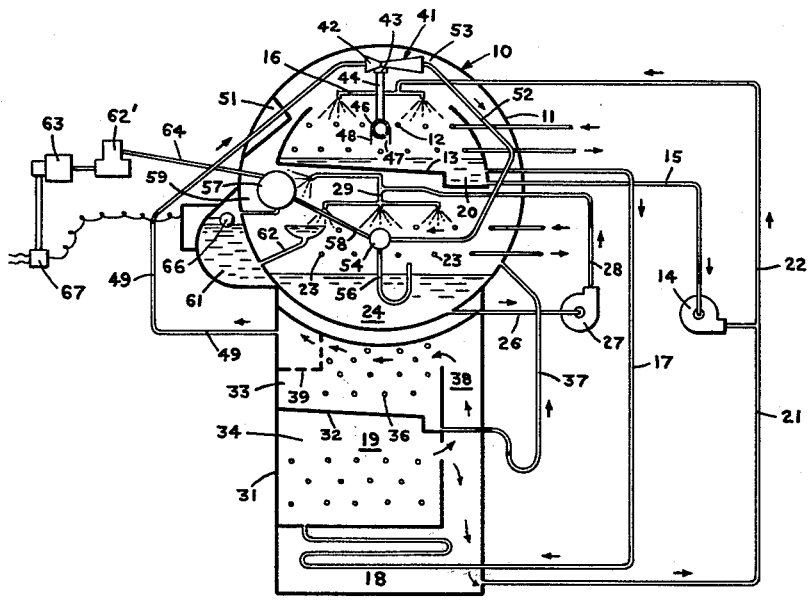
FIG. I
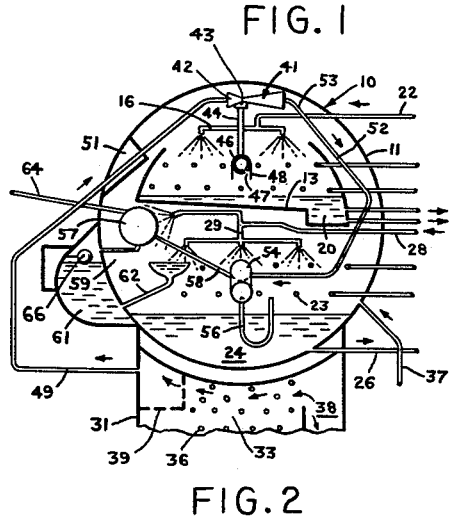
FIG. 2
INVENTORS
DAVID ARONSON
MARVIN K. ROHRS,
BY Daniel H. Bobs
Atty.

United States Patent Office 3,174,296
Patented Mar. 23, 1965

3,174,296
REFRIGERATION PURGE SYSTEM
David Aronson, Upper Montclair, and Marvin K. Rohrs, Fanwood, N.J., assignors to Worthington Corporation, Harrison, N.J., a corporation of Delaware
Filed Feb. 14, 1964, Ser. No. 344,871
18 Claims. (Cl. 62—85)

This invention relates to a refrigeration purge arrangement particularly adapted for removing non-condensible gases from an absorption refrigeration system.

The present closed absorption system circulates saline solution in varying degrees of concentration said solution consisting of a hydrophilic salt such as lithium bromide, and a refrigerant such as water. An apparatus of this type normally operates at pressures less than atmospheric, and is consequently susceptible to leakage of air into the closed system and to a tendency for accumulating other non-condensible vapors.

To maintain the system at operating capacity and rated pressures, it is necessary to remove these undesirable non-condensible elements without adversely affecting the quality of the refrigerant solution. If the non-condensible medium is permitted to accumulate within the confines of the system, there will be a gradual tapering off of efficiency and the eventual complete loss of system cooling capacity.

The present invention provides method and arrangement, in which non-condensible vapors are withdrawn from both system absorber and condenser. A combined flow stream is then passed through the low temperature evaporator of the system such that at a pressure higher than evaporator pressure a part of the fluid becomes condensed and is returned as a liquid. The residual non-condensible portion is then withdrawn through a vacuum pump or other suitable means and discharged from the system. A vacuum pump control device as a matter of practicality, is connected to the vacuum pump motor and functions to regulate operation of the vacuum pump to carry off the accumulated non-condensibles.

An object of the invention is therefore to provide a purging arrangement for an absorption refrigeration system in which a saline solution containing a hydrophilic salt and water is circulated, which arrangement is effective to maintain its predetermined vapor purity by removing non-condensible vapors from the system.

A further object is to provide a purge arrangement in an absorption refrigeration apparatus circulating a saline solution, for removing non-condensible gas which has accumulated from the system and for maintaining vapor purity on an intermittent basis as determined by a condition within the system.

A still further object is to provide an absorption system of the type described in which vapor withdrawn from the system main condenser, is directed through means for inducing non-condensibles from the system absorber.

Another object of the invention is to provide a purge system of the type contemplated employing an ejector connected to withdraw mixed condensible and non-condensible vapor from the absorber and being actuated by a motivating stream of vapor directed from the system condenser.

These and other objects of the invention will become clear to one skilled in the art from the following description of the apparatus and its mode of operation.

FIGURE 1 of the drawings illustrates diagrammatically a purge system of the type contemplated included in an absorption refrigeration apparatus.

FIGURE 2 is a segmentary view of a portion of the system shown in FIGURE 1.

The invention in brief relates to the combination in an absorption refrigeration system having an absorber, a condenser, a generator and an evaporator connected to form a closed circuit, of a purge arrangement connected into the system. The purge arrangement is operable intermittently to remove non-condensible vapors which leak into or form in, and tend to accumulate in the closed system thereby reducing the cooling efficiency. The purge arrangement includes an ejector connected to condensing means disposed within the system and to a receiver, the latter being connected to a vacuum pump for withdrawing vapor. The ejector receives a pressurized stream of condensible and non-condensible vapor from the system condenser, and thereby induces a secondary flow of vapor from the absorber. The combined flow is then passed through condensing means disposed in contact with a chilling medium as in the system evaporator for removing most of the condensible components of the flow.

The residual, comprising largely non-condensible vapor, is then passed to a receiver disposed within the system chiller where on further chilling additional vapor is condensed and the final residue consisting mainly of non-condensibles is carried from the system. Control means cooperative with the receiver for sensing vapor pressure may be connected to the purge pump motor for controlling the latter and for actuating the purge system. Alternatively vapor pressure may simply be indicated by change of level.

Referring to the drawings, the basic absorption system is illustrated as embodied in a shell enclosed apparatus designated 10 and including a first or lower pressure shell 11. A tube bundle 12 is supportably positioned in shell 11 and connected to a cooling tower, heat sink, or other source of cooling water circulatory system. An elongated pan 13 is supported longitudinally in shell 11 and is disposed directly beneath tube bundle 12. A sump 20 formed in pan 13 accumulates solution which is sprayed from header 16 positioned above tube bundle 12 in the shell upper section.

A conduit 15 connected to the sump 20 passes weak solution from the latter to the suction of pump 14. A second conduit 17 directs weak solution to an inlet of heat exchanger 18 for heating solution prior to boiling and reconcentration thereof in generator 19. Reconcentrated or strong solution having refrigerant removed is then carried through line 21 to line 22 at the discharge side of pump 14 thereby forming a solution of intermediate concentration which is passed through spray header 16 for introduction to the absorber.

A tube bundle 23 disposed in the lower part of shell 11 is connected to a source of liquid or fluid to be chilled by circulation in the evaporator cooling coil formed by bundle 23. A pool of solution collected in sump 24 of the lower part of shell 11 is circulated by way of line 26, pump 27, and line 28 to header 29 whereby the surface of tube bundle 23 is maintained in a wetted condition.

A second shell 31 disposed beneath, or in supporting relation to shell 11, includes a panel 32, forming an upper positioned condenser 33 and lower generator 34. Tube bundle 36 in the condenser circulates condensing or chilling water which may be taken from the discharge of absorber tube bundle 12 or from a cooling unit external to the apparatus and not presently shown. Because shells 11 and 31 operate at substantially different temperatures, and to avoid heat transfer between hot and cold segments of the system, said shells are either physically separated or provided with a suitable insulating wall. As shown in FIGURE 1, a double wall disposed between condenser and evaporator units reduces any thermal flow between the shells.

Line 37 connects condenser 33 through a U-tube arrangement forming a liquid trap, with the evaporator chamber for flashing condensed refrigerant into the latter.

The general arrangement of elements making up the present absorption system, and the operation thereof, are disclosed in the copending application entitled Absorption Refrigeration Apparatus, D. Aronson, filed on October 10, 1963 with Serial No. 229,632.

Under normal operating conditions, saline solution including lithium bromide as the absorbent and water as the refrigerant, is circulated in the system. As solution is sprayed into the low pressure absorber section tube bundle 12, refrigerant in vapor form is absorbed thereby forming a relatively weak solution which falls to pan 13 and accumulates in sump 20.

As presently noted, weak solution is carried through line 17 to heat exchanger 18 and generator 19. In the latter, the solution is boiled thereby passing vaporous refrigerant upward through passage 38 into condenser 33. Vapors sweeping across the upper surface of tube bundle 36 are deflected downwardly by means of a perforated baffle 39 fastened longitudinally of the shell on the upper wall thereof. Thus, the enclosure formed by baffle 39 will receive refrigerant vapor together with any non-condensible products which have formed in or entered the condenser, generator, or heat exchanger.

Saturated condensate is carried through line 37 and introduced into the lower pressure evaporator in which at least a portion of the refrigerant flashes. Refrigerant vapors rising from the evaporator, then enter the absorber section for contacting sprayed solution emitting from header 16.

Concentrated solution leaving generator 19 is carried through heat exchanger 18 prior to being intermixed with weak solution in line 22 and thereafter sprayed from header 16 in the manner above noted.

Since a characteristic of the present absorption system is operation at pressures less than atmospheric, any leakage occurring in the shell structure of the apparatus will permit air to enter the system and reduce the capacity of the machine unless such air is removed.

The following description relates directly to the purge arrangement incorporated in the herein described apparatus, for removing any and all vapors and non-condensible products which may form. Normally such non-condensibles will gravitate to the system condenser and absorber. In the condenser, non-condensibles are swept toward to the enclosure formed by baffle 39, and in the absorber such vapors are carried downwardly through tube bundle 12 by the solution sprayed from header 16.

*Purge arrangement*

Referring to FIGURE 2, the purge arrangement includes an ejector 41 supported at a convenient location in upper shell 11. While the ejector is presently shown within the confines of shell 11, this is a matter of expediency to reduce any occasion for leakage since the ejector could function equally as well if disposed external to the shell.

Ejector 41 includes an inlet 42 receiving a motivating fluid. A second inlet 43 is connected by conduit means 44 to a manifold 46 positioned at the lower portion of tube bundle 12. Manifold 46 extends substantially the length of shell 11 and includes a series of spaced openings 47 formed on the lower side to admit vapors of both condensible and non-condensible matter which have accumulated in the absorber section.

Manifold 46 is so formed of metallic pipe or tubing to avoid admission of liquids, and as shown includes a skirt 48 depending downwardly from the outer edges thereof to deflect liquid past the opening 47. As a further means of avoiding intake of liquid into openings 47, the latter may be disposed at a position offset from the bottom center of the manifold or along the sides thereof adjacent this inner edge of skirt 48.

The motivating force to ejector 41 is provided by a stream of refrigerant and non-condensible gases passed through line 49 having an inlet positioned within the enclosure of baffle 39. Thus, a constant stream of vapor under pressure of approximately 2½ inches of mercury absolute is carried through line 49 by way of the evaporator and absorber, the discharge of line 49 being connected to inlet 42 of ejector 41.

An insulating jacket 51 carried on the portion of line 43 disposed in the evaporator, avoids undue condensation of motivating vapors in the line while in the evaporator atmosphere. Line 49 extends for a short length external to shells 11 and 31, passing through the walls thereof at sealed, fluid tight joints.

Line 52 connected to discharge outlet 53 of ejector 41 carries a combined flow of condensible and non-condensible vapors in varying proportion to about 5% of non-condensible on a volume basis drawn from both of the condenser and absorber. A portion of the vapor thus carried in line 52 at a pressure of about ½ inch of mercury will condense on the metal walls of said line. Condensation will occur particularly in the lower section of the line disposed in the evaporator cooling atmosphere which normally functions at a reduced pressure of about ¼ inch of mercury.

Line 52 terminates and is connected to one end of an elongated manifold 54 which extends substantially the length of shell 11. Maximum condensation of ejector vapors in the evaporator is assured by disposing manifold 54 forming an auxiliary condenser to receive refrigerant sprayed from header 29. The said manifold 54 is biased downwardly toward the end remote from the connection with line 52, permitting liquid to accumulate at the remote end and thence pass through an overflow tube 56 into sump 24 holding liquid refrigerant.

An elongated metallic receiver 57 is disposed in the evaporator, and connected through line 58 to manifold 54 for withdrawing any non-condensibles remaining in the manifold. An outlet tube 59 connected to the lower part of receiver 57 passes any further condensate, and transmits pressure in the latter to a chamber 61 formed adjacent to the evaporator wall at the lower part thereof. A liquid collector 62 having a flared open end receives water from sprays 29 and by communication with chamber 61 maintains a level of liquid in chamber 61 dependent on the difference in pressure between the vapor in evaporator 15 and that of the mixture of condensibles and non-condensibles above the liquid in chamber 61.

For example, during the course of operation of the system, as the proportion of non-condensibles contained in the system is increased or decreased, the level of liquid in chamber 61 will correspondingly lower or rise thus giving an indication of the amount of non-condensibles present.

The purge arrangement may be continuously operated to withdraw non-condensibles but is more economically operated on an intermittent basis, or on a set times cycle. For example, the flow of motivating fluid through line 49 will be constant so long as the pressure within the condenser is sufficiently high to sustain the motivating stream. Thus there will be a continuous collection of non-condensibles. When the apparatus is devoid of non-condensible vapor, the stream of vapor carried through the ejector 41 will be passed into the manifold 54, condensed, and then deposited into sump 24 by way of overflow tube 56. Under such conditions, there will be no vaporous accumulation in receiver 57 and consequently the level of refrigerant in chamber 61 will be at a predetermined normal operating level and pump 62 will be inoperative.

As non-condensibles accumulate, whether through air leakage through the shells or whether developed in the system itself, non-condensible vapors will gradually be accumulated in receiver 57. The resulting increase in pressure in receiver 57 due to continued vapor accumulation, will depress the liquid level of refrigerant in chamber 61 to a point indicating that for the proper operation of the absorption system non-condensibles be removed from receiver 57.

Actuation of vacuum pump 62 connected to receiver 57 by way of line 64, will withdraw vapors from the receiver for discharge into the atmosphere or disposed of in any suitable manner.

As the water level in chamber 61 rises with evacuation of 57, thereby again indicating reduction of non-condensible vapors in 57, operation of purge pump 62 will be discontinued.

Control of the purge vacuum pump 62 is achieved by any number of systems known to the art. For example, the purge pump motor 63 may be manually operable in response to visual observation of the liquid level in chamber 61. It is preferable however that the entire operation be automatic so that pump 62 will operate only as needed or on a predetermined timed cycle.

When a timed cycle is the basis of the purge operation, the compressor motor may be so connected to operate only at given intervals. When the purger is to operate on signal, a device may be incorporated into the system to serve the pressure of non-condensible vapor.

For this purpose, a float mechanism 66 is disposed within chamber 61, movable with changes in liquid level therein for actuating a switch or other control element connected to motor controller 67. The latter is connected to a source of electrical energy and is preset to actuate motor 63 in response to the position of float element 66 within chamber 61.

From the foregoing description, it is seen that the present purge system embodies many advantages to assure economic and efficient operation of the absorption system at all times. The purger is preferably inbuilt within the enclosing shells to minimize the leak of air to the system. Also, since the motivating stream through ejector 41 is drawn from vapor contained in condenser 33, the refrigerating unit may be considered as self-purging.

It is noted that although the purge ejector and associated equipment are shown as being within the absorber shell, this does not constitute a necessary limitation to the apparatus. For example, by positioning the ejector external to shell 11, although the opportunity for air leakage into the system is increased, maintenance and replacement of parts is readily achieved. Similarly receiver 57 and manifold 54 may be constructed as an integral part of shell 11 and still permit utilization of the evaporator cooling atmosphere for condensing vapors.

It will be appreciated by those skilled in the art that the present arrangement provides a preferred embodiment of the invention, and changes and alterations may be made in the disposition and operation of the respective purge elements without departing from the spirit and scope of the invention.

What is claimed is:

1. A purge arrangement for an absorption refrigeration system circulating a vaporizable saline solution in liquid and vapor phase, and having an evaporator including a tube bundle carrying a fluid to be chilled, an absorber, a generator and a condenser including a vapor holding portion, said elements being connected into a closed circuit, said purge arrangement including:
    (a) an ejector having a first inlet receiving a pressurized stream of vapor and providing an ejector motivating stream,
    (b) said ejector having a second inlet connected to the system absorber for inducing a secondary vaporous stream including non-condensible vapor therefrom,
    (c) auxiliary condensing means positioned in heat exchange contact with said evaporator, being connected to the discharge of said ejector, and carrying therefrom a fluid stream of condensible and non-condensible vapors,
    (d) means for removing the non-condensible component of said fluid stream from the system and returning refrigerant condensate thereto.

2. In a purge arrangement as defined in claim 1 including means communicating said ejector first inlet with the system condenser vapor holding portion, and receiving a pressurized stream of vapor therefrom.

3. In a purge arrangement as defined in claim 1 wherein said auxiliary condensing means includes conduit means having an inlet connected to the ejector discharge, and having at least a portion of said conduit means disposed in the system evaporator cooling atmosphere for condensing fluid being passed through the conduit means.

4. In the arrangement defined in claim 3 wherein said conduit means includes an elongated pipe carrying a fluid stream and being disposed adjacent to the evaporator tube bundle for contacting refrigerant sprayed across the latter.

5. In the arrangement as defined in claim 3 wherein said auxiliary condensing means includes:
    (a) a pipe connected to the ejector discharge for receiving a fluid stream therefrom,
    (b) a receiver having an inlet connected to said heat exchange element, and having an outlet connected to means for receiving non-condensible vapors from the condensing means,
    (c) said means for receiving non-condensible vapors having a discharge outlet for directing said vapors from the absorption system.

6. In the arrangement defined in claim 5 wherein said receiver includes an outlet being connected to a pump means for inducing vapor from the receiver.

7. In the arrangement defined in claim 5 wherein said receiver includes a fluid tight heat exchange container disposed in said evaporator to be contacted by sprayed refrigerant, and having means for separately discharging non-condensible vapors and liquid condensate therefrom.

8. In an absorption refrigeration system including an evaporator, an absorber, a generator and a condenser, said system having a purge arrangement connected thereto and including:
    (a) an ejector communicated with said absorber and said condenser for withdrawing non-condensible vapors therefrom,
    (b) auxiliary condensing means connected to said ejector and receiving a stream of condensible and non-condensible vapors and for separating said stream into condensible and non-condensible components,
    (c) a vacuum pump having a suction inlet communicated with said auxiliary condensing means in the noncondensible portion thereof,
    (d) the combination therewith of means for regulating the operation of said pump means and including,
    (e) a sump disposed in said evaporator and holding a pool of refrigerant,
    (f) a line connecting said sump with said auxiliary condensing means for transmitting vapor pressure from said auxiliary condenser against the surface of said refrigerant pool,
    (g) means responsive to the change in level of the surface of said liquid pool for regulating operation of said pump means.

9. In the system defined in claim 8 wherein:
    (a) said pump includes a drive motor connected to a source of electric current,
    (b) said means responsive to the change in level of the surface of said pool includes an electric switch operable by sensing means,
    (c) said switch being connected to control the flow of electric current to said drive motor for regulating operation thereof in response to the liquid level in the sump.

10. In the system defined in claim 8 wherein said sump includes means connected to the evaporator and maintaining said refrigerant pool with a supply of refrigerant.

11. In the system defined in claim 8 wherein said sump is disposed below said evaporator tube bundle and receives a portion of the liquid refrigerant being sprayed therein.

12. In a self-purging absorption refrigeration system having a generator, an absorber, a condenser, and an evaporator communicated to form a closed circuit, the combination therewith of:
  (a) an ejector positioned in the absorber and receiving a stream of condensible and non-condensible vapors from said absorber and said condenser respectively,
  (b) an auxiliary condenser positioned in the evaporator and having an inlet means,
  (c) a line connecting said auxiliary condenser inlet with said ejector for delivering a stream of condensible and non-condensible vapors thereto,
  (d) a receiver positioned in the system evaporator,
  (e) said receiver being connected to the auxiliary condenser vapor holding portion and receiving non-condensible vapors accumulated in the latter,
  (f) a vacuum pump connected to said receiver for withdrawing non-condensible vapors therefrom,
  (g) said vacuum pump being coupled to a drive motor,
  (h) sensing means connected to said receiver and being actuated in response to the vapor pressure exerted by non-condensibles held in the receiver,
  (i) said sensing means being connected to said vacuum pump drive motor for controlling operation of the pump in response to pressure in said receiver.

13. In a system as defined in claim 12 including: a collecting means disposed in the absorber and being communicated with said ejector, said collecting means including openings disposed therein to receive vapor drawn from the absorber.

14. In a system as defined in claim 12 wherein: said collecting means includes an elongated conduit extending longitudinally of the absorber.

15. In a system as defined in claim 12 wherein: said collecting means includes an elongated conduit, extending longitudinally of the absorber, and having a skirt depending downwardly therefrom for deflecting liquid condensate, means having openings communicating said elongated conduit with the absorber, said means forming openings being disposed at a point offset from the lower portion of said conduit.

16. Method for purging non-condensible vapors from a closed absorption refrigeration system having higher and low pressure sides and circulating a saline solution, said system including an absorber, an evaporator, and a condenser interconnected to form the system, which method includes the steps of:
  (1) inducing a stream of condensible and non-condensible vapor from the lower pressure side of the system,
  (2) condensing said stream in the system evaporator to liquefy at least a portion of the stream for return thereof to the system,
  (3) and removing from the system that portion of said stream remaining in the vapor phase.

17. In the method for purging non-condensible vapors from a closed absorption refrigeration system having higher and low pressure sides and circulating a saline solution, said system including an absorber, an evaporator, and a condenser interconnected to form the system, which method includes the steps of:
  (1) forming a first pressurized vaporous stream drawn from the higher pressure side of the system,
  (2) inducing from the lower pressure side of the system with said first pressurized stream, a second stream of condensible and non-condensible vapor,
  (3) passing the combined first and second vapor streams into the system evaporator to liquefy the condensible portion thereof,
  (4) and removing from the system that portion of said stream remaining in the vapor phase.

18. Method for purging non-condensible vapors from a closed absorption refrigeration system having higher and low pressure sides and circulating a saline solution, said system including an absorber, an evaporator, and a condenser interconnected to form the system, which method includes the steps of:
  (1) passing a first pressurized vapor stream from the system condenser,
  (2) inducing into said first stream a second vapor stream drawn from the system absorber and including condensible and non-condensible portions,
  (3) chilling the combined vapor streams so formed to condense out at least a portion thereof into the liquid phase,
  (4) directing the non-condensible portion to heat exchanger means disposed in the system evaporator for further cooling thereof,
  (5) evacuating said heat exchange means for removing the non-condensible portions of said stream from the system.

References Cited by the Examiner
UNITED STATES PATENTS

| | | | |
|---|---|---|---|
| 1,889,191 | 11/32 | Baumann | 62—195 |
| 2,344,245 | 4/44 | Grossman | 62—475 |
| 2,353,859 | 7/44 | Thomas | 62—475 |
| 2,374,546 | 4/45 | Reid et al. | 62—195 |
| 2,400,137 | 5/46 | Reid | 62—85 |
| 2,703,968 | 3/55 | Berestnett | 62—475 |
| 2,940,273 | 6/60 | Leonard | 62—85 |
| 2,959,931 | 11/60 | Leonard | 62—101 |

ROBERT A. O'LEARY, *Primary Examiner.*